United States Patent Office 3,369,683
Patented Feb. 20, 1968

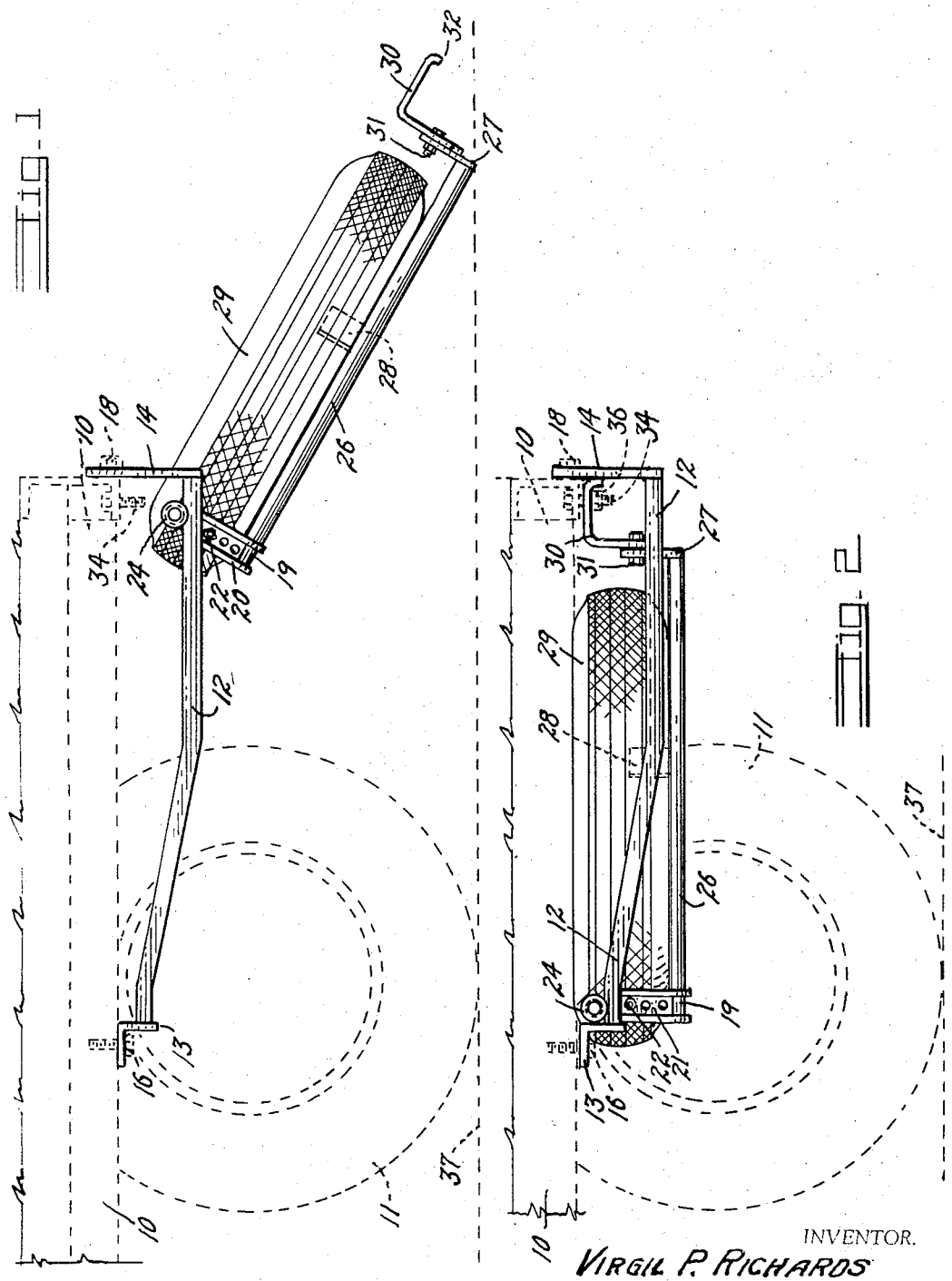

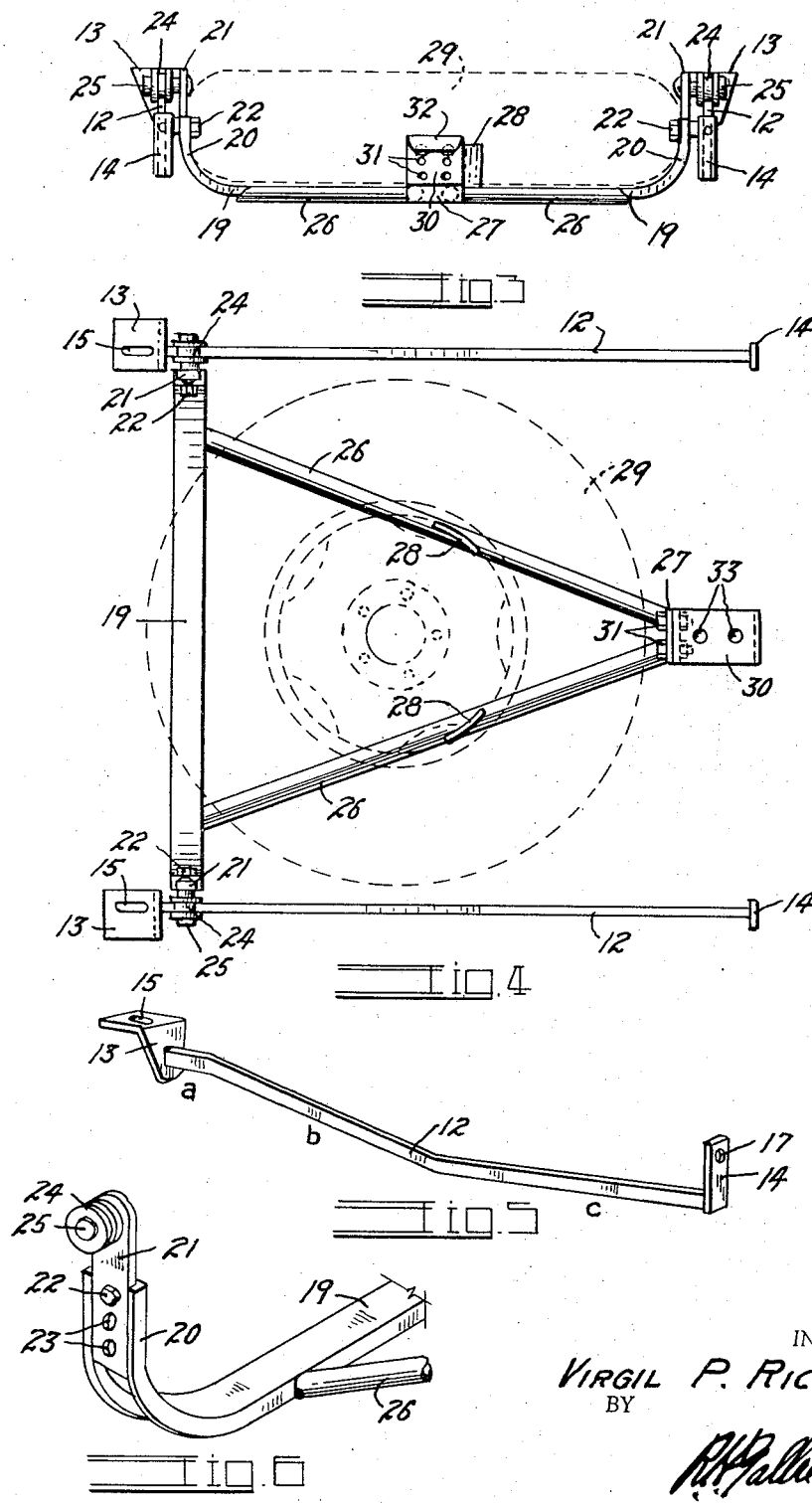

3,369,683
SPARE WHEEL CARRIERS
Virgil P. Richards, Denver, Colo., assignor of one-half to E. J. Wallace, Lakewood, Colo.
Filed June 6, 1966, Ser. No. 555,299
1 Claim. (Cl. 214—454)

ABSTRACT OF THE DISCLOSURE

Two parallel spaced-apart track bars secured beneath the chassis from a vehicle, the forward extremity of a spare wheel-carrier frame being supported on rollers traveling on said track bars, said track bars being contoured to elevate said wheel-carrier frame when the latter is pushed forwardly and to lower said wheel-carrier frame when the latter is pulled rearwardly and detachable means for supporting the rear extremity of said wheel-carrier frame.

---

This invention relates to a spare wheel carrier for vehicles, such as automotive trucks, and has for its principal object the provision of a carrier which will fixedly and securely support a spare wheel in a concealed, horizontal position beneath, and against the bottom of the truck bed while traveling and yet will allow the spare wheel to be quickly lowered and withdrawn to an easily accessible position at the rear of the truck bed when wheel replacement is necessary.

The invention is more particularly valuable for use upon a truck of the "pickup" type to the box of which an enclosed body of the "camper" type has been applied. The camper body leaves no accessible space for carrying a spare wheel in or on the box of the pickup. If the spare be attached beneath the pickup box, access thereto is blocked by the rearward projection of the camper body and by the rear wheels of the pickup. With the use of this invention, however, the spare wheel can be carried in this usually inaccessible position while traveling but can be quickly and easily moved to a completely accessible position at the rear of the truck for interchange.

Another object is to provide a spare wheel carrier which will securely maintain the wheel in proper position on the carrier without the use of threaded lugs, clamp nuts or other conventional securing devices.

A further object is to provide a simple, economical, lightweight carrier which will be easy to install, easy to use and which will withstand the rough usage to which such equipment is subjected.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawings:

FIG. 1 is a left side elevational view of the spare wheel carrier of this invention, in the open or accessible position, with a spare wheel in place thereon and with adjacent portions of a typical vehicle shown in broken lines;

FIG. 2 is a similar side elevational view showing the carrier in the closed or traveling position;

FIG. 3 is a rear elevational view of the carrier in the position of FIG. 2;

FIG. 4 is a top plan view of the carrier in the position of FIG. 2;

FIG. 5 is a detail, perspective view of a track member employed in the invention; and FIG. 6 is an enlarged, fragmentary, perspective view of a roller-hanger assembly to be later described.

The position of the chassis frame of a vehicle is indicated in broken line at 10 and the position of the rear wheels thereof is indicated at 11. The wheel to be carried is indicated in solid line in FIGS. 1 and 2 and in broken line in FIGS. 3 and 4 and designated by the reference numeral 29.

Briefly, the invention comprises mounting two longitudinally extending, spaced-apart track elements beneath the chassis frame of the vehicle and suspending the forward extremity of a wheel carrier frame from rollers traveling on the track elements so that the carrier frame can be moved forwardly from an inclined, exposed, ground-supported position at the rear of the vehicle, as shown in FIG. 1, to a horizontal traveling position beneath the vehicle, as shown in FIG. 2.

Each of the track elements comprises a track bar 12 welded to, and supported by, an angle bracket 13 at its forward extremity and by a vertical hanger strip 14 at its rear extremity. Each track bar extends horizontally rearward from the vertical portion of its respective angle bracket 13 for a short distance, as indicated at a in FIG. 5, thence inclines downwardly and rearwardly from approximately one-half its length, as shown at b, hence extends horizontally rearward to the hanger strip 14, as shown at c. The horizontal portions of the angle brackets are provided with elongated bolt holes 15 through which attachment bolts 16 may be extended to attach the brackets beneath the chassis frame 10. The hanger strips 14 are provided with bolt holes 17 to receive cap screws or bolts 18 for attaching and suspending the strips 14, and the rear extremities of the track bars 12, from the chassis frame or the rear bumper of the vehicle or other accessible support.

The wheel-carrier frame comprises a transversely-extending cross frame member 19 preferably of channel cross section, the extremities of which are arcuately upturned, as shown at 20. A vertically-elongated roller plate 21 is positioned in the channel of each upturned extremity 20 and extends upwardly therefrom. The roller plates are secured in place in their channels by means of suitable attachment bolts 22 which extend outwardly through the upturned extremities 20. The roller plates 21 are provided with a plurality of vertically spaced bolt holes 23 for receiving the bolts 22 so that the vertical extension of the plates 21 may be preset to accommodate various installations.

A circumferentially-grooved roller 24 is rotatably mounted on a stud shaft 25 affixed in, and projecting outwardly from, the upper extremity of each roller plate 21. The circumferential grooves in the rollers 24 are of sufficient width to receive and travel along the track bars 12.

Two brace tubes 26 are welded at their forward extremities to the cross frame member 19, adjacent the upturned extremities of the latter, and extend rearwardly and inwardly toward each other in a common plane. The rear extremities of the brace tubes 26 are brought together and welded or otherwise permanently attached to an upstanding, medially-positioned terminal plate 27. A wheel-positioning lug 28 is mounted on and extends upwardly from each of the brace tubes. The lugs 28 are so positioned that the rim of a spare wheel 29 may be fitted over the lugs so that the wheel will be maintained in a medial, substantially horizontal position on the brace tubes 26 as shown in FIG. 4.

A hanger bracket 30 is bolted to the terminal plate 27 by means of suitable bolts 31 and extends rearwardly therefrom. The hanger bracket is turned down at its rear edge, as shown at 32, so that it may, if desired, be hooked over any convenient support such as the rear bumper or a cross frame member of the vehicle. The bracket 30 is also provided with vertical bolt holes 33 whereby it may, if desired, be detachably bolted beneath the bumper or a rear cross frame member of the chassis by means of suitable bolts 34.

The terminal plate 27 and the hanger bracket 30 are provided with a plurality of bolt holes 35 to receive the bolts 31 so that the bracket can be vertically pre-adjusted to place the frame tubes 26 in a horizontal plane in the traveling position of FIG. 2 on various types of vehicles.

It is believed that the method of use and the advantages obtained by the use of the invention are clearly disclosed by the above description and the accompanying drawings. Briefly, the carrier frame is pulled rearwardly to the position of FIG. 1 and the spare wheel 29 is laid thereon over the positioning lugs 28. The hanger bracket is then manually lifted and pushed forwardly, the rollers 24 traveling forwardly along the track bars 12. As the rollers travel up the inclined portions b of the track bars, the front of the carrier frame will rise into close proximity to the bottom of the chassis frame 10 and the rollers will finally come to rest on the horizontal portions a of the track bars. The hanger bracket 30 is now manually lifted into engagement with the stud bolts 34 and secured by suitable nuts 36 which, when tightened, will urge the entire wheel carrier frame upwardly to clamp the spare wheel tightly against the bottom of the chassis frame or truck box, as shown in FIG. 2, so that it cannot move or vibrate in any direction. To remove the spare wheel, it is only necessary to remove the nuts 36 so that the carrier may be pulled rearwardly and lowered to thee ground, as indicated by the ground line 37 in FIG. 1 to allow the wheel to be lifted therefrom.

While a specific form of the invention has been described and illustrated herein, it is to be understood that the same may be varied within the scope of the appended claim, without departing from the spirit of the invention.

Having thus described the invention what is claimed and desired to be secured by Letters Patent is:

1. A carrier for supporting a spare wheel beneath the chassis frame of a vehicle comprising:
    (a) two similar elongated transversally straight track bars, each track bar being vertically contoured to form a relatively short horizontal track portion at its forward extremity, a relatively long horizontal track portion at its rear extremity, said two horizontal track portions being joined by a rearwardly and downwardly inclined intermediate portion;
    (b) means for securing the forward and rear extremities of each track bar beneath said chassis frame in transversely parallel relation with the relatively-short horizontal portions at a higher elevation and in closer relation to said chassis frame than the relatively-long horizontal portions;
    (c) an elongated cross frame member having upturned extremities positioned between said track bars;
    (d) a circumferentially-grooved roller rotatably mounted on the outer face of each upturned extremity, the circumferential grooves in the rollers traveling on and guiding said cross frame member along said track bars;
    (e) a pair of brace tubes each tube being secured at its rear extremity adjacent one of the upturned extremities of said cross frame member and extending rearwardly and inwardly toward each other in the plane of said cross frame member;
    (f) an upstanding terminal plate securing the rear extremities of said brace tubes together;
    (g) a wheel positioning lug mounted upon and extending upwardly from each brace tube intermediate the extremities of the latter to enter and maintain a spare wheel in a medial horizontal position on said brace tubes; and
    (h) means for detachably attaching said terminal plate to the rear of said chassis frame so that when said rollers are in position on the short horizontal track portions said plate may be attached to urge said wheel upwardly against said chassis frame and when said plate is detached said plate may be drawn rearwardly to cause said rollers to travel downwardly on the inclined medial portions to lower said wheel from said chassis frame and allow it to be tilted downwardly with the rollers acting as pivot elements on the long horizontal back portions.

References Cited

UNITED STATES PATENTS

| 1,672,356 | 6/1928 | Wesserfallen | 214—454 |
| 2,034,834 | 3/1936 | Robinson | 214—451 |
| 2,063,092 | 12/1936 | Groden | 214—151 |
| 2,806,616 | 9/1957 | Fisher et al. | 214—454 |

FOREIGN PATENTS 144,741    3/1954    Sweden.

HUGO O. SCHULZ, *Primary Examiner.*